S. E. NORRIS.
SEEDER AND PLANTER.
APPLICATION FILED FEB. 19, 1913.
1,093,462.
Patented Apr. 14, 1914.
2 SHEETS—SHEET 1.
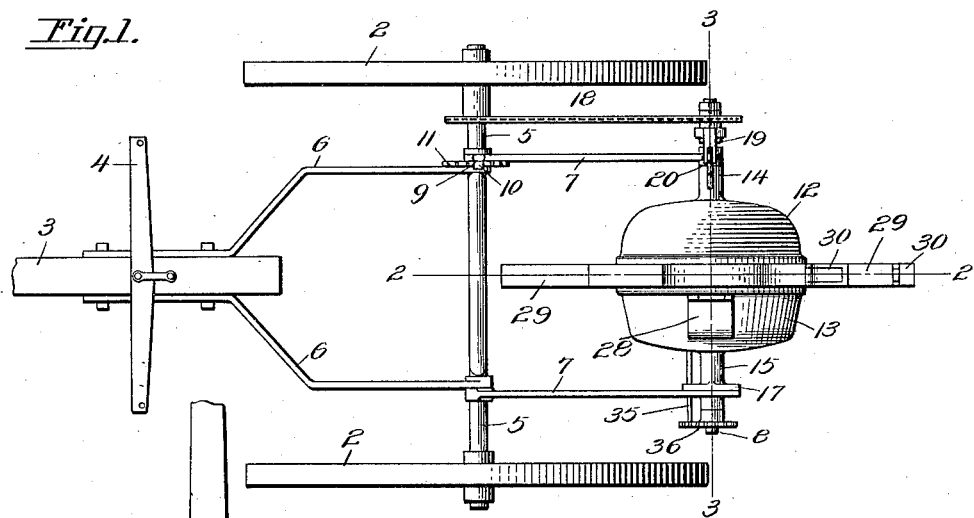
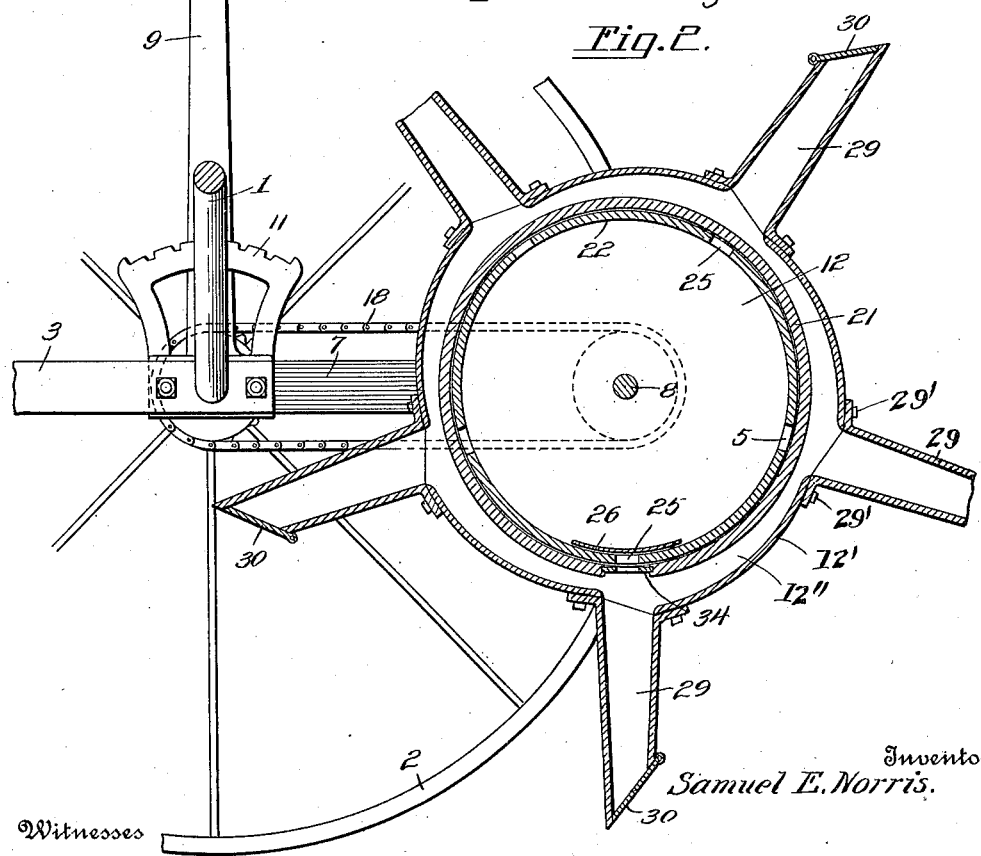
Witnesses
F. C. Gibson.
Inventor
Samuel E. Norris.
By Victor J. Evans
Attorney S. E. NORRIS.
SEEDER AND PLANTER.
APPLICATION FILED FEB. 19, 1913.
1,093,462.
Patented Apr. 14, 1914.
2 SHEETS—SHEET 2.
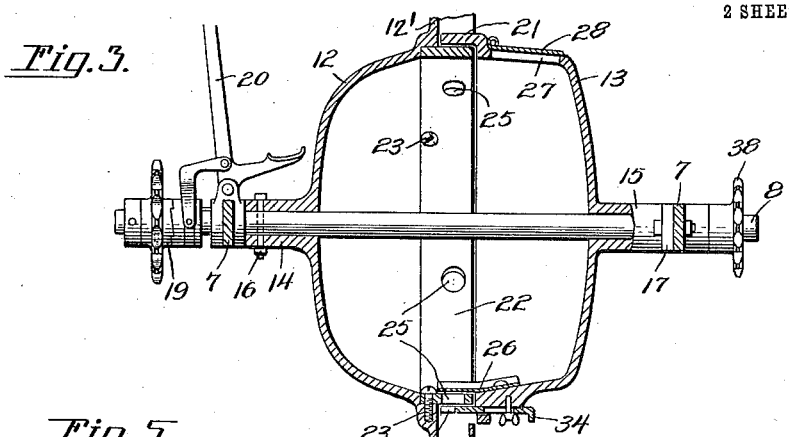
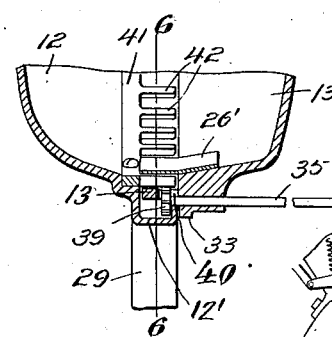
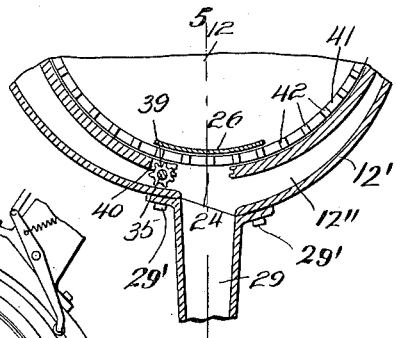
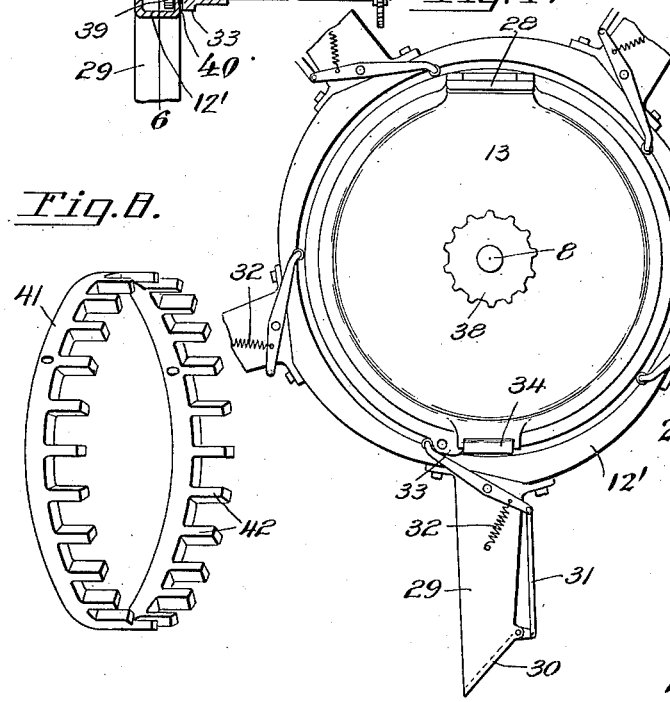
Inventor
Samuel E. Norris.
Witnesses
By Victor J. Evans
Attorney

UNITED STATES PATENT OFFICE.

SAMUEL E. NORRIS, OF CROWELL, TEXAS.

SEEDER AND PLANTER.

1,093,462. Specification of Letters Patent. Patented Apr. 14, 1914.

Application filed February 19, 1913. Serial No. 749,512.

*To all whom it may concern:*

Be it known that I, SAMUEL E. NORRIS, a citizen of the United States, residing at Crowell, in the county of Foard and State of Texas, have invented new and useful Improvements in Seeders and Planters, of which the following is a specification.

This invention relates to seeders and planters, and it has for its object to provide a device of simple and improved construction which may be utilized for planting and for replanting corn and other seeds, for planting cotton and for other like purposes.

A further object of the invention is to produce a device of the class described of simple and improved construction which by the exchange and substitution of minor parts may be readily converted from a corn planter to a cotton planter.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings, Figure 1 is a top plan view of a planter constructed in accordance with the invention. Fig. 2 is a longitudinal sectional view taken on the line 2—2 in Fig. 1. Fig. 3 is a vertical transverse sectional view taken on the line 3—3 in Fig. 1. Fig. 4 is a side view of the drum which constitutes the hopper and related parts, some parts having been broken away for the purpose of exposing the interior construction. Fig. 5 is a sectional detail view taken on the line 5—5 in Fig. 6, and showing the device converted into a cotton planter. Fig. 6 is a sectional detail view taken on the line 6—6 in Fig. 5. Fig. 7 is a perspective detail view of the seed ring. Fig. 8 is a perspective detail view of the cotton planting ring which is sometimes substituted for the seed ring.

Corresponding parts in the several figures are denoted by like characters of reference.

The improved seed planter may in practice be used in connection with a cultivator in which event the cultivator shovels may be utilized for covering the seed. In the drawings, however, it has been shown in connection with an ordinary arched axle 1 having transporting wheels 2 and a forwardly extending tongue 3 to which the draft may be applied by means including an evener 4. Pivotally mounted on the spindles 5 of the axle adjacent to the hounds 6 which support the forwardly extending tongue are frame bars 7 affording bearings for the shaft 8 of the planter. Suitably associated with one of the frame bars 7 is an adjusting lever 9 having a stop member 10 engaging a suitably supported segment rack 11 and serving to support the frame bars 7 carrying the shaft 8 in any of the various positions to which said parts may be adjusted by means of the lever 9.

The hopper of the improved planter consists of a drum which may be of ovoidal or other suitable shape, said drum being composed of two cup-shaped parts or members 12 and 13, having respectively tubular stems 14, 15 for the reception of the shaft 8, which latter extends axially through the drum. The stem 14 of the cup 12 is secured on the shaft 8 by a fastening member such as a bolt 16. The stem 15 of the cup 13 is provided with flanges 17 bolted on the proximate frame bar 7, thereby causing the cup 13 to be held stationary with respect to the rotation of the shaft. The latter receives motion from one of the transporting wheels 2 by means including a transmission chain 18 and a clutch 19 operable by a lever 20, whereby the transmission may be thrown in or out of gear, as required.

The stationary cup or member 13 is provided with a marginal flange or lip 21 which overlaps the meeting edge of the cup or member 12, the latter being provided with an annular ring or flange 22 detachably secured by fastening means such as screws 23, said ring being surrounded by and contacting with the lip or flange 21. The latter has a seed aperture 24, and the ring 22 is provided with a plurality of apertures forming seed cups 25. A cut-off 26 may be secured within the stationary cup 13 in registry with the seed opening 24. The stationary cup or member 13 is provided with a filling aperture 27 which may be obstructed by a suitable door or closure 28 and through which seed may be placed within the drum or hopper.

The cup 12 which rotates with the shaft 8 is provided with an annular flange portion 12' spaced therefrom by the interspace 12'' and with which is connected a plurality of seed spouts or chutes 29 extending radially therefrom in registry with the seed cups 25. The space 12' may be open at one side or it may be obstructed in any convenient manner. The spouts are mounted detachably on the flange by fastening members 29' in front and in rear thereof, as clearly seen in Fig. 6. Each one of the spouts 29 is provided with a foot valve 30 adapted to be actuated by an operating rod 31 which is pressed by a spring 32, whereby the foot valve 30 is maintained normally in a closed or obstructing position. The stationary cup or member 13 has a lug or projection 33 lying in the path of the operating rods 32, which latter, when engaged by said lug, will be actuated to throw the foot valve connected therewith open. This operation is timed to take place just as the chutes leave the ground for the purpose of depositing the seed.

The stationary cup or member 13 of the hopper is provided with a slide 34, whereby the dimensions of the seed aperture 24 may be regulated. Supported for rotation upon or adjacent to the cup member 13 is a shaft 35 deriving motion from the main shaft 8 by means of a chain 36 guided over sprocket wheels 37, 38 on the shafts 35 and 8, respectively. The shaft 35 carries a toothed wheel 39, a portion of which projects within the seed aperture 24 through a slot 40 in the cup or member 13. This device which is used principally for planting cotton seed serves to pull the seeds through the seed aperture 24. When corn or other seeds are to be planted the shaft 35 and related parts may be omitted. It may also be stated that when cotton seed is to be planted I substitute for the seed ring 22 a ring 41 having laterally extending fingers 42 that will engage the cotton seed and pull it in the direction of the seed aperture.

The operation of this invention will be readily understood from the foregoing description when taken in connection with the drawings hereto annexed. The planting mechanism may be thrown into or out of gear by the lever 20. When the device is to be used for replanting it may be moved into or out of planting position by means of the lever 9.

Having thus described the invention, what is claimed as new, is:—

In a seed planter, a hopper comprising mating cup-shaped members, one of said members being relatively stationary and the other member being supported for rotation, an annular lip formed on the stationary hopper member and having a seed aperture, a cut-off secured within the stationary hopper member and overlapping the seed aperture, a seed ring secured within the rotary hopper member and projecting between the annular lip and the cut-off of the stationary hopper member, a shaft supported for rotation on the stationary hopper member and carrying a seed distributer, and means imparting rotary motion to the seed distributer shaft.

In testimony whereof I affix my signature in presence of two witnesses.

SAMUEL E. NORRIS.

Witnesses:
W. E. NORRIS,
E. H. COWAN.

Copies of this patent may be obtained for five cents each, by addressing the "Commissioner of Patents, Washington, D. C."